2,941,980
Patented June 21, 1960

2,941,980
COMPOSITION CONTAINING VINYL PYRROLIDONE POLYMER STABILIZED WITH ALKYLATED PHENOL

Gerald Robinson, Bronx, N.Y., assignor to General Aniline & Film Corporation, New York, N.Y., a corporation of Delaware No Drawing. Filed Nov. 8, 1956, Ser. No. 621,025

20 Claims. (Cl. 260—45.95)

This invention relates to new and useful compositions of matter and in particular to compositions comprising polyvinylpyrrolidone and derivatives thereof with alkylated phenols which compositions are possessed of outstanding, unusual and unexpected properties.

Polyvinylpyrrolidone, in recent years, has become increasingly important because of its outstanding and unusual properties not possessed by any other polymeric material. Thus it is known to use this material as a blood plasma substitute. It forms excellent films and is being used in increasing quantities in the cosmetics field as a hair fixative. This polymer, by virtue of its water-solubility and also its solubility in many organic solvents, is extremely versatile in its many applications. In the light of all the known properties of polyvinlypyrrolidone, it was nevertheless completely unexpected that compositions containing this polymer when modified with certain alkylated phenols, would exhibit the unusual properties hereinafter to be described.

It is therefore an object of this invention to provide new and useful compositions comprising polyvinylpyrrolidone and water-souble copolymers thereof in combination with alkylated phenols.

It is a further object of this invention to provide new and useful compositions having outstanding adhesive characteristics.

It is another object of this invention to provide new and useful compositions of matter which are excellent plasticizers for various resins.

Another object of this ivention is to provide new compositions of matter which give excellent protective coatings on metal articles.

It is still another object of this invention to provide new compositions which may be employed for the sizing of siliceous, and in particular glass fibers.

Other objects will appear as the description proceeds.

The compositions of this invention comprise two essential ingredients thereof, polyvinylpyrrolidone or derivatives thereof, or water-soluble copolymers of such vinyl pyrrolidones, in combination with alkydlated phenols. In addition to the homopolymer of polyvinylpyrrolidone, one may employ various lower alkyl derivatives thereof. Such derivatives include:

3-methyl-N-vinyl-2-pyrrolidone
4-methyl-N-vinyl-2-pyrrolidone
3,3-dimethyl-N-vinyl-2-pyrrolidone
4-ethyl-N-vinyl-2-pyrrolidone
5-methyl-N-vinyl-2-pyrrolidone
5-ethyl-N-vinyl-2-pyrrolidone and the like. Water-soluble copolymers of the aforementioned compounds can also be employed. Such copolymers include vinylpyrrolidone in combination with the following ethylenically unsaturated compounds:

Allyl alcohol
Diallyl phthalate
Isobutyl vinyl ether
Maleic anhydride
Vinyl acetate
Vinyl chloride
Acrylic acid
Vinyl laurate
Vinyl stearate, and the like Such copolymers should contain a minimum of 20% vinylpyrrolidone in order to produce a water-soluble product with most of the aforementioned compounds. The following copolymers exemplify those which are useful in the present invention:

|   |   | Percent |
|---|---|---|
| 1. | Vinylpyrrolidone | 50 |
|    | Allyl alcohol | 50 |
| 2. | Vinylpyrrolidone | 80 |
|    | Diallyl phthalate | 20 |
| 3. | Vinylpyrrolidone | 80 |
|    | Isobutyl vinyl ether | 20 |
| 4. | Vinylpyrrolidone | 50 |
|    | Ethyl vinyl ether | 50 |
| 5. | Vinylpyrrolidone | 20 |
|    | Methyl vinyl ether | 80 |
| 6. | Vinylpyrrolidone | 20 |
|    | Maleic anhydride | 80 |
| 7. | Vinlypyrrolidone | 60 |
|    | Vinyl acetate | 40 |
| 8. | Vinylpyrrolidone | 65 |
|    | Vinyl chloride | 35 |
| 9. | Vinylpyrrolidone | 25 |
|    | Acrylic acid | 75 |
| 10. | Vinylpyrrolidone | 80 |
|    | Vinyl laurate | 20 |
| 11. | Vinylpyrrolidone | 85 |
|    | Vinyl stearate | 15 |
| 12. | Vinylpyrrolidone | 70 |
|    | Allyl alcohol | 30 |
| 13. | Vinylpyrrolidone | 85 |
|    | Diallyl phthalate | 15 |
| 14. | Vinylpyrrolidone | 60 |
|    | Vinyl ethyl ether | 40 |
| 15. | Vinylpyrrolidone | 30 |
|    | Vinyl methyl ether | 70 |
| 16. | Vinylpyrrolidone | 75 |
|    | Vinyl acetate | 25 |
| 17. | Vinylpyrrolidone | 50 |
|    | Acrylic acid | 50 |
| 18. | Vinylpyrrolidone | 94 |
|    | Vinyl stearate | 6 |
| 19. | 3-methyl-vinylpyrrolidone | 87 |
|    | Vinyl bromide | 13 |
| 20. | 3-methyl-vinylpyrrolidone | 87 |
|    | Vinyl chloride | 13 |
| 21. | 4-ethyl-vinylpyrrolidone | 88 |
|    | Vinyl chloride | 12 |
| 22. | 3,3-dimethyl-vinylpyrrolidone | 91 |
|    | Vinyl chloride | 9 | and the like. The molecular weights of the polymers and copolymers may range from about 300 to 70,000 or more. Viscosity measurements are commonly used as an indication of the average molecular weight of the polymeric composition. The K value (Finkentscher) of any particular mixture of polymers is calculated from viscosity data and is useful as an indication of the average molecular weight of such mixture. The determination of the K value is fully described in "Modern Plastics," vol. 23, No. 3, pp. 157–61, 212, 214, 216 and 218 (1945), and is defined as 1000 times $k$ in the empirical relative viscosity equation:

$$\frac{\log_{10} \eta \text{ rel.}}{C} = \frac{75k^2}{1+1.5kC} + k$$

wherein C is the concentration in grams per 100 cc. polymer solution and $\eta$ rel. is the ratio of viscosity of solution to that of pure solvent. The K values are reported as 1000 times the calculated viscosity coefficient in order to avoid the use of decimals. For the purpose of the present invention, there may be employed those polymeric substances having a K value of about 10 to 200, preferably from about 15 to 100.

K values and specific viscosities ($\eta$ sp.) are interconvertible and are related through relative viscosity ($\eta$ rel.). Thus, when viscosity measurements are taken on solutions which have a concentration of 1.00 g. polymer per deciliter of solution at 25° C. ($C=1$), the relations are as follows:

1. $\eta$ rel.$=\eta$ sp. $+1$
2. Relative viscosity$=$specific viscosity $+1$
3. Relative viscosity$=10[0.001K+0.000075K^2/(1+0.0015K)]$
4. $\eta$ sp.$=-1+10[0.001K+0.000075K^2/(1+0.0015K)]$ Relative viscosity, specific viscosity, and K are dimensionless, whereas inherent viscosity (log.$e$ $\eta$ rel. $\div C$) and intrinsic viscosity (the limit of inherent viscosity as C approaches 0) have the dimensions of dilution, that is, the reciprocal of concentration. Intrinsic viscosity and K are intended to be independent of concentration.

The alkylated phenols which may be employed in the compositions in this invention are those having the following general formula:

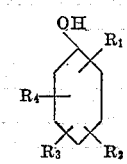

wherein $R_1$, $R_2$, $R_3$, and $R_4$ are hydrogen or alkyl radicals of from 1 to 9 carbon atoms and the sum of the carbon atoms in $R_1$, $R_2$, $R_3$ and $R_4$ is at least 4. Examples of alkylated phenols within the above formula include the following:

Butyl phenols, for example,
    o-Butyl phenol
    m-Butyl phenol
    p-n-Butyl phenol
    p-Sec-butyl phenol
    p-Isobutyl phenol
    p-Tertiary-butyl phenol
    Diisobutyl phenol
Octyl phenol
Dioctyl phenol
Nonyl phenol
Dinonyl phenol
p-Tertiary amyl phenol
p-Isoamyl phenol
Thymol
Diethyl phenols
Tetraethyl phenols
Butyl ethyl phenol
p-(1-ethyl isobutyl)-phenol
Hexyl phenol
Sec-hexyl phenol
Diisopropyl phenol
Dipropyl phenol
Ethyl propyl phenol
Isopropyl xylenol The compositions of this invention comprise the polymeric vinyl compound and alkylated phenol wherein there is present at least 25% by weight of phenolic compound based on the weight of the mixture (that is, at least one part phenol for each three parts of polymer by weight). The maximum amount of phenol is dependent upon the particular desired properties and ultimate use of the compounds and may approximate 100%. Above 90% phenol content, the composition is usually a liquid with liquid or low melting phenols. Between 25 and 90% phenol content the compositions are capable of producing films of various degrees of tack varying from no tack to very tacky and having varying degrees of plasticization and hardness. Within the range of 25% to about 40% phenol content the compositions are water-sensitive and may be employed as excellent water rewettable or remoistenable adhesives. Above 40% phenol content, the composition is water-insensitive and may be employed as resin plasticizers, in coating compositions, as adhesives, in printing inks, etc. as hereinafter to be described.

In the following examples which are given as illustrative only and are not to be deemed limitative in any way, parts are in grams unless otherwise indicated.

EXAMPLE 1

3 g. of nonyl phenol and 7 g. of polyvinylpyrrolidone are dissolved in 100 cc. of anhydrous ethyl alcohol. A clear, compatible solution results. A film of this solution is cast on a glass plate and air dried. The resultant film is not tacky when so dried. When wet with water, the film becomes very tacky and there may be adhered thereto paper and other films such as cellophane, polyethylene, cellulose acetate and the like. The dry film is relatively soft and is only very slightly brittle, thereby insuring an excellent bond to the various lamina above described.

EXAMPLE 2

Example 1 is repeated employing 3 g. of dinonyl phenol in lieu of nonyl phenol. The results obtained are similar to that of Example 1.

EXAMPLE 3

A solution of 6 g. polyvinylpyrrolidone and 4 g. of dinonyl phenol in 100 cc. of alcohol is prepared. The resultant solution is clear and compatible. A film is cast from this solution as described in Example 1. The resultant dry film exhibits no tack and is relatively insensitive to water. The film is relatively soft and exhibits no brittleness. This composition may be employed for preparing coatings, and in particular coatings on metal which exhibit exceptionally high gloss and excellent adhesion to the base. Thus, when a solution as herein prepared is sprayed upon a chrome plated piece of steel, there results a highly tenacious, glossy, non-tacky protective coating for the metal object. This coating being somewhat slightly sensitive to water, may, if desired, be removed with relative ease using hot water.

EXAMPLE 4

A clear and compatible solution of 4½ g. dinonyl phenol and 5½ g. polyvinyl pyrrolidone in 100 cc. of ethyl alcohol is prepared. A film is cast as described in Example 1 on a glass plate and air dried. This film is not tacky when dry and insensitive to water. The film is soft and well plasticized. This solution is used to prepare coatings on metal objects as described in Example 3, and there results similar tenacious, glossy, protective coatings. This coating, however, as contrasted with that of Example 3, affords protection against water.

EXAMPLE 5

A 10% solution in ethyl alcohol of equal parts by weight of dinonyl phenol and polyvinylpyrrolidone is prepared. When cast in the manner described in Example 1, the resultant films exhibit only very slight tack when dry and they are completely water-insensitive. In addition, the films are soft and well plasticized. This composition is particularly adaptable for use as a laminating adhesive especially for polyethylene films since the composition forms an exceedingly tenacious and adherent coating on polyethylene. Lamination may be effected in the well known manner by coating either one or two polyethylene films and sealing said films by the application of a small amount of heat. With this composition temperatures of the order of 60 to 100° C. are effective for such sealing purposes.

EXAMPLE 6

10% solutions in alcohol are prepared containing (1) 4 g. of polyvinylpyrrolidone and 6 g. of dinonyl phenol, (2) 3 g. of polyvinylpyrrolidone and 7 g. of dinonyl phenol, and (3) 2 g. of polyvinylpyrrolidone and 8 g. of dinonyl phenol. The films cast from these solutions are completely water-insensitive and exhibit increasing tack when dry as the phenolic content is increased. All of the films are soft and well plasticized. These compositions may be employed as laminating adhesives similarly as the composition of Example 5.

EXAMPLE 7

A composition comprising 1 part polyvinylpyrrolidone ($K$=30), 2 parts nonyl phenol and 10 cc. of ethyl alcohol was prepared. This formulation is brushed on a film of polyethylene and when dried, laminated to a sheet of paper employing in the latter step a temperature of 75° C. and a pressure of 20 lb./sq. in. (between blocks). The resultant laminated structure could not be separated without tearing either the paper or the polyethylene.

The following Table I gives the K value of the polyvinylpyrrolidone employed in Examples 1–6:

Table I

| Example: | K value |
|---|---|
| 1 | 30 |
| 2 | 30 |
| 3 | 15 |
| 4 | 20 |
| 5 | 40 |
| 6(1) | 50 |
| 6(2) | 50 |
| 6(3) | 50 |

EXAMPLE 8

The procedure of Example 1 is repeated employing dioctyl phenol in lieu of nonyl phenol. The resulting film has properties similar to that obtained in Example 1.

EXAMPLE 9

Example 8 is repeated using a polyvinylpyrrolidone having a K value of 70. The results are similar to Example 8.

EXAMPLE 10

Example 8 is again repeated using a polyvinylpyrrolidone having a K value of 100. Again, a similar result is obtained.

EXAMPLE 11

Example 5 is repeated using diisobutyl phenol in lieu of dinonyl phenol. An excellent adhesive is produced.

EXAMPLE 12

Example 7 is repeated using (a) a polyvinylpyrrolidone having a K value of 75, (b) a polyvinylpyrrolidone of K value 100, (c) a polyvinylpyrrolidone of K value 20. In each instance, the formulation forms an excellent adhesive for polyethylene and for such material to other lamina such as paper, cellulose acetate, and metallic foils of aluminum and copper.

EXAMPLE 13

Example 7 is repeated employing in lieu of nonyl phenol, (a) dinonyl phenol, (b) dioctyl phenol, (c) octyl phenol, (d) hexyl phenol, (e) diisobutyl phenol, and (f) p-isoamyl phenol. Excellent adhesive bonds between polyethylene and paper are produced in each instance.

EXAMPLE 14

One part of polyvinylpyrrolidone ($K$=30) is added to 2 parts of dinonyl phenol at a temperature of 80° C. A clear, compatible, liquid solution results. This "solventless" mixture may be used to protect metals and as coatings on polyethylene and paper. The latter may be laminated with heat or before the coating cools. The resulting laminates of polyethylene to polyethylene and polyethylene to paper have properties similar to the laminate of Example 7.

EXAMPLE 15

The procedure of Example 14 is repeated using (a) 3 parts of dinonyl phenol, (b) 4 parts of nonyl phenol, (c) 4 parts dioctyl phenol, (d) 5 parts diisobutyl phenol, (e) 5 parts hexyl phenol, and (f) 6 parts of p-tertiary butyl phenol. In all cases excellent laminates are obtained.

The following examples demonstrate various compositions into which it is desirable to incorporate polymers and copolymers of vinyl pyrrolidone and its substitution products.

EXAMPLE 16

1 part of polyvinylpyrrolidone ($K$=30) are added to 2 parts of nonyl phenol and stirred until dissolved.

1 part of xylene is added as a thinner. This composition is then added to 80 parts of an oil modified alkyl (acid No.=67) suitable for use in inks of the heat set type (setting time 360° F., 30 sec.). The above composition is mixed with equal parts of (a) Rhodamine dry
(b) Rubine dry to make two ink compositions. Cobalt naphthenate (0.5%) is added and tested after mixing 4 times on a 3-roll mill by casting 1.5 mil films. In each instance smooth, homogeneous, non-grainy films are obtained. The use of polyvinylpyrrolidone speeds the printing cycle by giving better release from the rolls. By the use of mixtures of polyvinylpyrrolidone with nonyl phenol (and other phenols within the purview of this invention) it is possible to incorporate the polyvinylpyrrolidone into the ink composition which is not so in the absence of the phenol. In a similar manner it is now possible to incorporate vinyl pyrrolidone containing polymers into numerous compositions which are normally non-solvents for or incompatible with such polymeric substances. Thus polyvinylpyrrolidone is generally not soluble in hydrocarbon solvents, in ketones, in carbon tetrachloride, in perchloroethylene, in dioxane, etc., but a combination of polyvinylpyrrolidone and the above described alkylated phenols is soluble in these compounds.

EXAMPLE 17

1 part of polyvinylpyrrolidone ($K$=30) is dissolved in 3 parts of dinonyl phenol (75° C.). 5 parts of this mixture is soluble in 95 parts of the following liquid to give clear solutions:

Mineral spirits
Naphtha
Toluene
Xylene
Acetone
Methyl ethyl ketone
Carbon tetrachloride
Perchloroethylene
Dioxane By virtue of this unexpected solubility it is possible to incorporate polyvinylpyrrolidone, and thereby its valuable characteristics, into solutions of waxes, silicones, plasticizers and the like.

EXAMPLE 18

5 parts of a mixture of 1 part polyvinylpyrrolidone ($K=50$) and 3 parts dioctyl phenol are dissolved in 95 parts of naphtha. Into this solution are stirred 5 parts of carnauba wax. A clear, compatible solution results. The addition of the polyvinylpyrrolidone adds greatly to the gloss, adhesion, and flexibility of films produced by this solution on metals, glass, wood and the like.

EXAMPLE 19

The procedure of Example 18 is repeated using candelilla wax instead of carnauba wax. Similar outstanding and unexpected results are obtained.

EXAMPLE 20

The procedure of Example 18 is again repeated using beeswax. Again, comparable results are forthcoming.

EXAMPLE 21

Example 18 is repeated employing the following in lieu of wax:

(a) Alcohol soluble siloxanes
(b) Diglycol oleates
(c) Dioctyl phthalate
(d) Butanediol
(e) Glycerol The compositions of this invention also exhibit outstanding and unexpected compatibility and coincident therewith impart highly advantageous properties to many resins and plastics. A mixture of polyvinylpyrrolidone and alkylated phenol is compatible and acts to plasticize polyethylene when milled with polyethylene. By virtue of the resultant compatibility it is also possible to incorporate various fillers and modifiers (e.g., carbon, other pigments) to give excellently dispersed products as a result of the outstanding dispersing action of polyvinylpyrrolidone and related compounds. Other resins which are compatible with the compositions of this invention include the epoxy resins, polyvinyl acetate, polyvinyl ethers, e.g., polyvinyl methyl ether, and the like. With epoxy resins, the polyvinylpyrrolidone alkylated phenol composition is particularly outstanding in excellent manner in which fillers such as carbon, silica and the like may be dispersed therein, a problem long wanting a solution.

EXAMPLE 22

The procedure of Example 18 is repeated employing the following phenols and parts thereof per part of polyvinylpyrrolidone:

(a) 3 parts nonyl phenol
(b) 3 parts dinonyl phenol
(c) 4 parts hexyl phenol
(d) 5 parts p-tertiary amyl phenol
(e) 4 parts octyl phenol Similar results are obtained as in Example 18.

EXAMPLE 23

Examples 18 and 22 are repeated employing the following vinyl pyrrolidone-containing polymers with each of the phenols of Example 8 and 22:

Polyvinylpyrrolidone, $K=30$
Polyvinylpyrrolidone, $K=70$
3-methyl-N-vinyl-2-pyrrolidone polymer, $K=35$
4-ethyl-N-vinyl-2-pyrrolidone polymer, $K=40$
3,3-dimethyl-N-vinyl-2-pyrrolidone polymer, $K=70$
Copolymer of vinylpyrrolidone (50%) and allyl alcohol (50%), $K=30$
Copolymer of vinylpyrrolidone (80%) and diallyl phthalate (20%), $K=50$
Copolymer of vinylpyrrolidone (20%) and methyl vinyl ether (80%), $K=30$
Copolymer of vinylpyrrolidone (40%) and methyl vinyl ether (60%), $K=67$
Copolymer of vinylpyrrolidone (70%) and vinyl acetate (30%), $K=42$
Copolymer of vinylpyrrolidone (25%) and acrylic acid (75%), $K=35$
Copolymer of vinylpyrrolidone (35%) and acrylic acid (65%), $K=25$
Copolymer of vinylpyrrolidone (60%) and ethyl vinyl ether (40%), $K=25$
Copolymer of vinylpyrrolidone (75%) and vinyl chloride (25%), $K=85$
Copolymer of 3-methyl-vinyl pyrrolidone (90%) and vinyl chloride (10%), $K=65$
Copolymer of 3-methyl-vinyl pyrrolidone (87%) and vinyl bromide (13%), $K=38$
Copolymer of 3,3-dimethyl-vinyl pyrrolidone (91%) and vinyl chloride (9%), $K=47$ The results obtained are comparable to those of Examples 18 and 22.

EXAMPLE 24

A mixture of 1 part polyvinylpyrrolidone, 3 parts dinonyl phenol and 10 parts of carbon black are milled into 100 parts of polyethylene. The resultant product is formed into a sheet in which the pigment is excellently dispersed.

EXAMPLE 25

Example 16 is repeated employing the following phenols in lieu of nonyl phenol:

(a) 2 parts dinonyl phenol
(b) 3 parts hexyl phenol
(c) 3 parts octyl phenol
(d) 3 parts p-tertiary amyl phenol

EXAMPLE 26

Example 25 is repeated employing instead of 1 part polyvinylpyrrolidone ($K=30$), 1 part of each of the copolymers described in Example 23 and additionally the following:

Polyvinylpyrrolidone, $K=42$
Polyvinylpyrrolidone, $K=70$
Polyvinylpyrrolidone, $K=92$
3-methyl-N-vinyl-2-pyrrolidone polymer, $K=35$
4-ethyl-N-vinyl-2-pyrrolidone polymer, $K=40$
3,3-dimethyl-N-vinyl-2-pyrrolidone polymer, $K=70$ In each instance the compositions of Examples 25 and 26 give excellent results.

EXAMPLE 27

To 100 parts of an epoxy ether resin having an epoxy equivalent of 190–210 (available under the brand name of "Epon" 828) there are added a mixture of 3 parts dinonyl phenol, 3 parts polyvinylpyrrolidone ($K=42$), 100 parts of carbon black and 6 parts diethylenetriamine. After vigorously mixing, the composition is printed onto a ceramic plate and baked for 15 minutes at 150° C. to yield continuous, hard and adherent coatings of 10 mils thickness and 1 mm. in width. Electrical measurements indicate that per unit length the resistance is uniform within a tolerance of 10%. In the absence of polyvinylpyrrolidone and dinonyl phenol similar films varied in resistance per unit length by a factor of as much as four. It is thus possible to produce printed circuits having resistors of outstanding uniformity.

I claim:
1. A composition comprising an alkylated phenol having the formula:

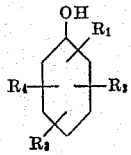

wherein $R_1$, $R_2$, $R_3$, and $R_4$ are selected from the group consisting of hydrogen and alkyl radicals of from 1 to 9 carbon atoms and the sum of the carbon atoms in said alkyl radicals being at least 4 and a water-soluble polymer selected from the group consisting of homopolymers of vinyl pyrrolidone, homopolymers of vinyl alkyl-substituted pyrrolidones and water-soluble copolymers of the aforementioned pyrrolidones with ethylenically-unsaturated compounds, the ratio of phenol to polymer being at least 1:3.

2. A composition as defined in claim 1 wherein the water-soluble polymer is polyvinyl pyrrolidone.

3. A composition as defined in claim 1 wherein the water-soluble polymer is a copolymer of vinyl pyrrolidone with an ethylenically unsaturated compound.

4. A composition as defined in claim 1 wherein the water-soluble polymer is a copolymer of vinyl pyrrolidone and vinyl acetate.

5. A composition as defined in claim 1 wherein the water-soluble polymer is a copolymer of vinyl pyrrolidone and acrylic acid.

6. A composition as defined in claim 1 wherein the water-soluble polymer is a copolymer of vinyl pyrrolidone and a vinyl alkyl ether.

7. A composition as defined in claim 1 wherein the water-soluble polymer is a copolymer of vinyl pyrrolidone and vinyl ethyl ether.

8. A composition as defined in claim 1 wherein the water-soluble polymer is a copolymer of vinyl pyrrolidone and maleic anhydride.

9. A composition comprising an alkylated phenol having the formula:

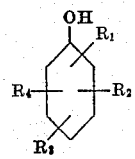

wherein $R_1$, $R_2$, $R_3$, and $R_4$ are selected from the group consisting of hydrogen and alkyl radicals of from 1 to 9 carbon atoms and the sum of the carbon atoms in said alkyl radicals being at least 4 and a water-soluble polymeric substance having a K value of from about 10 to 200 selected from the group consisting of homopolymers of vinyl pyrrolidone, homopolymers of vinyl alkyl-substituted pyrrolidones and water-soluble copolymers of the aforementioned pyrrolidones with ethylenically-unsaturated compounds, the ratio of phenol to polymer being at least 1:3.

10. A composition as defined in claim 9 wherein the phenol is nonyl phenol.

11. A composition as defined in claim 9 wherein the phenol is dinonyl phenol.

12. A composition as defined in claim 9 wherein the phenol is octyl phenol.

13. A composition as defined in claim 9 wherein the phenol is dioctyl phenol.

14. A composition as defined in claim 9 wherein the phenol is hexyl phenol.

15. A composition comprising a water-soluble polyvinyl pyrrolidone having a K value of from about 10 to 200 and dinonyl phenol, the latter being present to the extent of at least 25% of the said two ingredients.

16. A composition comprising a homopolymer of vinyl pyrrolidone having a K value of from about 10 to 200 and at least one-third by weight thereof based on the weight of the homopolymer of an alkylated phenol having the formula:

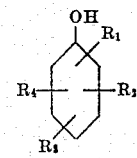

wherein $R_1$, $R_2$, $R_3$, and $R_4$ are selected from the group consisting of hydrogen and alkyl radicals of from 1 to 9 carbon atoms and the sum of the carbon atoms in said alkyl radicals being at least 4.

17. A composition comprising a homopolymer of vinyl pyrrolidone having a K value of from about 10 to 200 and an alkylated phenol containing at least 4 non-cyclic carbon atoms the ratio of polymer to phenol being no greater than 3:1.

18. A composition comprising a water-soluble copolymer of at least 20% of vinyl pyrrolidone and the remainder being an ethylenically-unsaturated compound and having a K value of from about 10 to 200 and dinonyl phenol in the weight ratio of at least 1 part of phenol per 3 parts of copolymer.

19. A composition comprising a water-soluble copolymer of at least 20% of vinyl pyrrolidone and the remainder being an ethylenically-unsaturated compound and having a K value of from about 10 to 200 and nonyl phenol in the weight ratio of at least 1 part of phenol per 3 parts of copolymer.

20. A composition comprising a homopolymer of vinyl pyrrolidone having a K value of from about 15 to 100 and dinonyl phenol in the ratio of at least 1 part of dinonyl phenol per 3 parts of polymer.

References Cited in the file of this patent
UNITED STATES PATENTS

| | | |
|---|---|---|
| 2,057,690 | Moss | Oct. 20, 1936 |
| 2,360,864 | Fryling | Oct. 24, 1944 |
| 2,667,473 | Morner et al. | Jan. 26, 1954 |
| 2,676,949 | Morner et al. | Apr. 27, 1954 |